United States Patent [19]

Krantz et al.

[11] Patent Number: 5,568,899
[45] Date of Patent: Oct. 29, 1996

[54] LIGHTWEIGHT VIDEO CASSETTE CARTRIDGE

[75] Inventors: Kermit T. Krantz; Charles R. Jones, Jr., both of Leawood, Kans.

[73] Assignee: V-Lite Corporation, Leawood, Kans.

[21] Appl. No.: 435,589

[22] Filed: May 5, 1995

[51] Int. Cl.⁶ .......................... G11B 23/04; G11B 23/087
[52] U.S. Cl. ......................................... 242/347.2; 360/132
[58] Field of Search ................................ 242/347.2, 347; 360/132; 229/242

[56] References Cited

U.S. PATENT DOCUMENTS

| | | | |
|---|---|---|---|
| 3,899,079 | 8/1975 | Seiter | 229/242 X |
| 4,158,412 | 6/1979 | Wysocki | 229/242 X |
| 4,290,567 | 9/1981 | Saito | 242/343.1 |
| 4,438,892 | 3/1984 | Fitterer et al. | 242/345.2 |
| 4,449,633 | 5/1984 | Johnson et al. | 229/242 X |
| 4,452,407 | 6/1984 | Ogata et al. | 242/336 |
| 4,453,683 | 6/1984 | Reimer et al. | 242/336 |
| 4,505,440 | 3/1985 | Kawashima | 242/343.2 |
| 4,559,574 | 12/1985 | Umeda | 242/338.3 |
| 4,763,218 | 8/1988 | Westfall et al. | 360/132 |
| 4,802,048 | 1/1989 | Perkins et al. | 242/343 |
| 4,819,890 | 4/1989 | Carroll | 242/346 |
| 4,842,217 | 6/1989 | Vinson | 360/132 X |
| 4,883,176 | 11/1989 | Hart et al. | 206/387 |
| 4,969,612 | 11/1990 | Thomas | 206/387 X |
| 5,092,536 | 3/1992 | Gelardi et al. | 242/343 |
| 5,114,092 | 5/1992 | Gelardi et al. | 242/345.2 |
| 5,199,662 | 4/1993 | Klupt | 242/347.2 |
| 5,199,663 | 4/1993 | Klupt | 242/345 |
| 5,201,476 | 4/1993 | Gelardi et al. | 242/345.2 |
| 5,311,388 | 5/1994 | McLaren | 242/347 X |
| 5,398,881 | 3/1995 | Krantz et al. | 242/347.2 |

FOREIGN PATENT DOCUMENTS

| 1552251 | 9/1979 | United Kingdom . |
| 2104872 | 3/1983 | United Kingdom . |

*Primary Examiner*—John Q. Nguyen
*Attorney, Agent, or Firm*—Hovey, Williams, Timmons & Collins

[57] ABSTRACT

A lightweight video cassette cartridge formed of recyclable materials is provided. The cassette cartridge includes a video tape housing and a dust cover. The dust cover includes a base portion fixedly attached to the video tape housing and a tear strip releasably attached to the base portion for covering the video tape contained in the video tape housing when attached to the base portion and for re-exposing the video tape for play in a VCR when removed from the base portion.

5 Claims, 1 Drawing Sheet

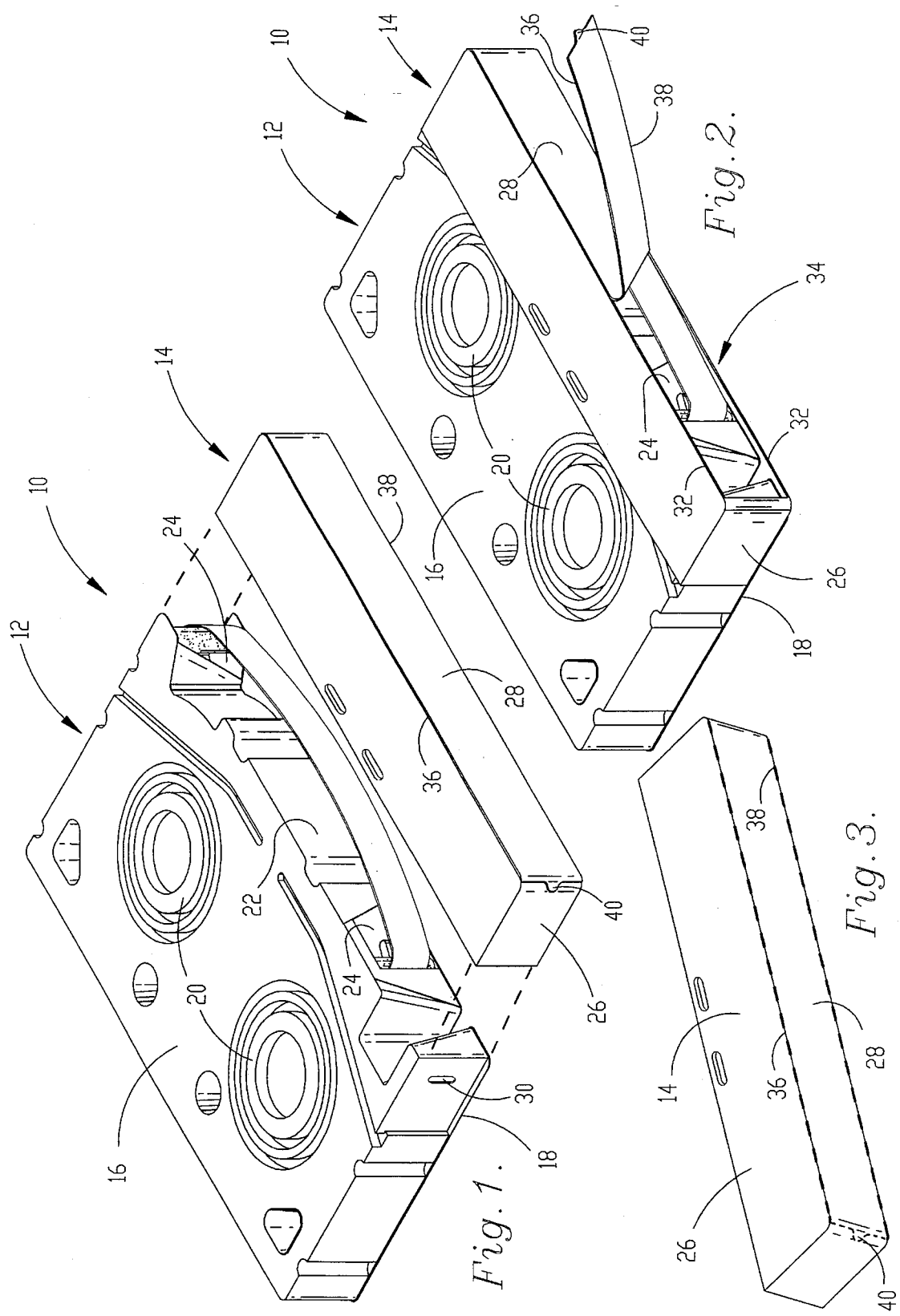

LIGHTWEIGHT VIDEO CASSETTE CARTRIDGE

FIELD OF THE INVENTION

The present invention relates to an inexpensive, limited use video cassette cartridge formed of lightweight, recyclable materials, and more particularly to a lightweight video cassette cartridge including a dust cover having a releasable tear strip.

BACKGROUND OF THE INVENTION

The recent proliferation of video cassette players and recorders has created a new market for video taped advertisements and messages. This new market has created an enormous demand for inexpensive and lightweight limited use video cassette cartridges that are suitable for mailing. These cassettes are also suitable for non-commercial recordings such as public service announcements and personal messages sent to family and friends.

Prior art attempts to construct lightweight limited use video cassette cartridges have been generally unsuccessful. For example, many prior art video cassette cartridges contain numerous individual parts formed of various materials. The use of such a great number and variety of parts raises the cost and manufacturing time of the cassette cartridges and defeats recyclability. Additionally, prior art video cassette cartridges are formed of heavier materials, and thus are costly to transport and mail.

The applicants of the present application have designed novel cassette cartridges that have successfully overcome many of the problems associated with prior art lightweight limited use video cassette cartridges. For example, U.S. Pat. No. 5,398,881 discloses a lightweight video cassette cartridge that performs all of the functions of a permanent-use video cassette cartridge, but comprises only 8 parts, all made of lightweight recyclable materials. Application Ser. No. 08/321 257 discloses a lightweight video cassette cartridge including a passive reel braking system that replaces more complicated and expensive active braking systems found in prior art cassette cartridges. Application Ser. No. 08/343,369 discloses a lightweight video cassette cartridge including a solid-core that adds structural rigidity to the cassette cartridge while replacing the conventional parts of prior art cassette cartridges.

Applicants have recently discovered a new improvement that solves another limitation in prior art lightweight limited use video cassette cartridges. In particular, prior art limited use cassette cartridges include dust covers that are either hinged to the cassette housing or separately formed and removable from the cassette housing. The hinged dust covers require metal hinges that defeat the recyclability of the cartridge and are costly. The removable dust covers often slip off the cartridge during shipping and handling, resulting in damage to the exposed video tape. Moreover, these removable dust covers add to the number of parts of the cassette cartridge and are frequently lost once removed.

Thus, there is a need for an improved lightweight video cassette cartridge that overcomes the limitations described above.

SUMMARY AND OBJECTS OF THE INVENTION

In view of the limitations of prior art video cassette cartridges described above, it is an object of the present invention to provide an improved lightweight limited use video cassette cartridge that includes a dust cover that more effectively protects the video tape from damage during shipping and handling.

It is another object of the present invention to provide a lightweight limited use cassette cartridge that includes a dust cover that is fixedly attached to the cartridge housing without the use of costly metal hinges.

It is another object of the present invention to provide a lightweight limited use cassette cartridge that includes a dust cover that is inexpensive to manufacture.

In accordance with these and other objects evident from the following description of a preferred embodiment of the invention., an improved lightweight video cassette cartridge is provided. The preferred lightweight video cassette cartridge broadly includes a video tape housing and a dust cover having a removable tear strip.

In more detail, the video tape housing includes walls defining an interior chamber for storing and winding video tape therein and structure defining a plurality of slots in the front wall of the cartridge for exposing video tape contained therein for play in the VCR.

The dust cover is provided for covering the slot in the housing for protecting the exposed video tape from damage during shipping and handling. The dust cover includes a base portion and a tear strip. The base portion is fixedly attached to the video tape housing by glue or other adhesives and includes an opening extending substantially the entire length of the front wall of the video tape housing. The opening is in substantial alignment with the housing slot so that the video tape extending from the slot is not covered by the base portion.

The tear strip is releasably attached to the base portion and is sized so that it covers the opening in the base portion when attached thereto. When the cassette cartridge is ready to be played in a VCR, the tear strip is removed from the base portion so that the video tape is exposed for play. The tear strip can be releasably attached to the base portion with adhesives or can be integrally formed with the base portion and releasably attached by a perforated or die-cut edge.

By constructing a lightweight video cassette cartridge as described above, numerous advantages are realized. For example, by providing a cassette cartridge having a dust cover that is fixedly attached to the cartridge housing, the dust cover remains fixed to the cartridge housing during shipping and handling and thus protects the video tape contained therein.

Additionally, by providing a cassette cartridge having a dust cover that includes a removable tear strip, the assembled cassette cartridge contains fewer parts and is thus less costly to manufacture.

Another advantage is that by providing a cassette cartridge having a removable tear strip, the video tape contained in the cartridge can be protected during shipping and handling without adding significant weight to the cartridge.

BRIEF DESCRIPTION OF THE DRAWINGS

A preferred embodiment of the present invention is described in detail below with reference to the attached drawings, wherein:

FIG. 1 is an exploded view of a lightweight video cassette cartridge constructed in accordance with a preferred embodiment showing the dust cover removed from the video tape housing;

FIG. 2 is a top perspective view of the cassette cartridge showing the dust cover attached to the video tape housing and the tear strip partially removed from the dust cover; and FIG. 3 is a top perspective view of a second embodiment of the dust cover.

DETAILED DESCRIPTION OF THE PREFERRED EMBODIMENT

Referring to FIG. 1, a lightweight video cassette cartridge 10 constructed in accordance with the preferred embodiment is illustrated. The preferred cassette cartridge 10 is designed for use with a conventional video cassette recorder (VCR) and broadly includes a video tape housing 12 and a dust cover 14. Both the housing 12 and the dust cover 14 are preferably formed of lightweight recyclable materials such as synthetic resin or paperboard.

In more detail the housing 12 preferably includes a pair of spaced apart top and bottom panels 16 and 18, and a pair of video tape reels (not shown) rotatably mounted within the video tape housing 12 for winding of video tape. The top and bottom panels 16 and 18 are generally rectangular in shape and are spaced a distance apart to define an interior hollow chamber therebetween. A solid core structural member or conventional posts can be positioned within this hollow chamber for maintaining the spaced relationship between the top and bottom panels 16 and 18.

The top panel 16 includes a pair of reel springs 20 integrally molded thereon. As discussed in detail in commonly owned U.S. Pat. No. 5,398,881, hereby incorporated by reference, the video tape reels are subjected to an upward force from the VCR drive spindles which tends to push the reels upward towards the top panel and out of alignment. The reel springs 20 are configured to exert an opposing downward force upon the video tape reels when subjected to an upward force delivered by the VCR spindles.

Bottom panel 18 includes walls defining a pair of drive openings (not shown) for receiving the drive spindles of a VCR. The drive openings are aligned with the video tape reels so that the VCR spindles cooperate with the video tape reels.

The top and bottom panels 16 and 18 are secured together to form the assembled housing 12. The assembled housing 12 presents a front wall 22 including structure defining a plurality of slots 24 extending into the housing interior chamber. The slots 24 are provided for transferring video tape between the video tape reels and for exposing a portion of the video tape for play in the VCR.

The dust cover 14 is provided for covering the housing slots 24 so that the exposed video tape is protected from damage during shipping and handling and before the video cassette cartridge 10 is played in the VCR. The dust cover 14 broadly includes a base portion 26 and a tear strip 28.

The base portion 26 slides over the front face of the video tape housing 12 and includes spaced apart top, bottom, left side, and right side faces. The frontmost edges of the left and right side faces are tapered inwardly so that the base portion 26 does not slide beyond the front face 22 of the video tape housing 12. To prevent the dust cover 14 from sliding off the video tape housing 12 during shipping and handling, the left and right side faces are fixedly attached to the video tape housing 12 by glue or other conventional adhesives. The video tape housing 12 may include a plurality of raised edges 30 formed on its left and right sidewalls for facilitating the adhesion of the base portion 26 to the video tape housing 12.

As illustrated in FIG. 2, the frontmost edges of the top, bottom, and left and right side faces of the base portion 26 define an elongated opening 34 extending substantially the entire length of the base portion 26. The elongated opening 34 is in alignment with the video tape housing slots 24 when the base portion 26 is attached to the video tape housing 12. With this configuration, the base portion 26 does not cover the video tape extending from the slots 24 when the dust cover 14 is attached to the video tape housing 12.

The tear strip 28 is releasably attached to the base portion 26 and is sized so that it covers the elongated opening 34 of base portion 26 when attached thereto. The tear strip 28 is generally rectangular in shape and presents opposed upper and lower longitudinal edges 36 and 38. When attached to the base portion 26, these longitudinal edges 36 and 38 mate with the base portion 26 for covering the base portion elongated opening 34.

The tear strip 28 may be releasably attached to the base portion 26 in variety of manners. For example, as illustrated in FIGS. 1 and 2, the longitudinal edges 36 and 38 of the tear strip 28 can be releasably attached within the opening 34 with conventional adhesives such as glue. Alternately, as illustrated in FIG. 3, the tear strip 28 can be integrally formed with the base portion 26 with its longitudinal edges 36 and 38 having lines of weakness such as being perforated or die-cut so that they are releasably attached to the base portion 26. The tear strip 28 preferably includes a pull-tab 40 on one end thereof for facilitating its removal from the base portion 26.

The above-described cassette cartridge 10 can be assembled in several easy steps. First, the video tape reels are loaded with video tape containing a pre-recorded message and inserted into the assembled video tape housing 12. The dust cover 14 is then installed over the front face of the video tape housing and glued or otherwise attached to the raised edges on the sidewalls of the video tape housing 12. When the video cassette cartridge 10 is ready to be played in a VCR, the tear strip 28 is removed from the base portion 26 by gripping the pull-tab 40 and pulling the tear strip 28 across the length of the video cassette cartridge 12.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A video cassette cartridge for use in a video cassette recorder, said video cassette cartridge comprising:

a video tape housing;

a pair of video tape reels rotatably mounted within said housing for storing and winding video tape thereon;

said video tape housing having a slot for exposing the video tape; and a dust cover for covering said slot to protect the exposed video tape from damage, said dust cover including
   a base portion attached to said housing, and
   a tear strip releasably attached to said base portion by lines of weakness between said base portion and said tear strip so that said tear strip covers said slot when attached to said base portion and exposes the video tape for play in the video cassette recorder when removed from said base portion.

2. The video cassette cartridge as set forth in claim 1, wherein said tear strip includes opposed upper and lower longitudinal edges that are attached within said opening for covering said opening when said tear strip is attached to said base portion.

3. The video cassette cartridge as set forth in claims, wherein said tear strip is integrally formed with said base portion.

4. The video cassette cartridge as set forth in claim 5 wherein said upper and lower longitudinal edges are perforated so that said tear strip is releasably attached to said base portion.

5. The video cassette cartridge as set forth in claim 1, wherein said tear strip includes a pull-tab on one end thereof for facilitating the removal of said tear strip from said base portion.

* * * * *